(12) United States Patent
Kayser et al.

(10) Patent No.: US 8,104,817 B2
(45) Date of Patent: Jan. 31, 2012

(54) MOTOR VEHICLE

(75) Inventors: Martin Kayser, Leonberg (DE); Jan Kretzschmar, Stuttgart (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 0 days.

(21) Appl. No.: 12/883,350

(22) Filed: Sep. 16, 2010

(65) Prior Publication Data

US 2011/0148136 A1    Jun. 23, 2011

(30) Foreign Application Priority Data

Dec. 18, 2009 (DE) .......................... 10 2009 058 988

(51) Int. Cl.
*B60R 7/04* (2006.01)
(52) U.S. Cl. ..................................... 296/37.8; 296/37.15
(58) Field of Classification Search ................ 296/37.1, 296/37.8, 37.15
See application file for complete search history.

(56) References Cited

U.S. PATENT DOCUMENTS

| | | | | |
|---|---|---|---|---|
| 6,120,069 | A * | 9/2000 | Taranto | 292/35 |
| 6,736,438 | B1 | 5/2004 | Wieclawski | |
| 6,802,550 | B1 | 10/2004 | Griggs, Jr. et al. | |
| 2002/0030376 | A1* | 3/2002 | Butz et al. | 296/37.15 |
| 2007/0296236 | A1* | 12/2007 | Sitzler et al. | 296/37.8 |
| 2009/0134633 | A1 | 5/2009 | Thies et al. | |
| 2009/0218842 | A1 | 9/2009 | Muller | |
| 2010/0001539 | A1* | 1/2010 | Kikuchi et al. | 292/138 |

FOREIGN PATENT DOCUMENTS

| | | |
|---|---|---|
| DE | 100 09 291 A1 | 9/2001 |
| DE | 103 11 928 A1 | 9/2004 |
| DE | 10 2004 028 846 B3 | 8/2006 |
| DE | 10 2005 043 593 A1 | 3/2007 |
| DE | 10 2004 025 394 B4 | 2/2009 |

OTHER PUBLICATIONS

German Patent and Trademark Office Search Report, Dated June 16, 2010.

* cited by examiner

*Primary Examiner* — Dennis Pedder
(74) *Attorney, Agent, or Firm* — Laurence A. Greenberg; Werner H. Sterner; Ralph E. Locher

(57) ABSTRACT

A motor vehicle has a storage compartment which contains a housing and a lid which closes the housing. The storage compartment further has a locking mechanism which has a housing-side closing bar and a lid-side bolt which interacts with the latter and which engages behind the closing bar in the locked state and releases from the closing bar through rotation. The storage compartment is arranged essentially vertically between two rear seats of the motor vehicle, wherein the lid can be adjusted between a closed position which abuts against the housing and an open position which is moved forward. An arrestor hook, which is formed as an emergency securing device, is arranged on an inner side of the lid. If force is suddenly applied to the housing in the direction of the lid, in particular in the event of a crash, the arrestor hook engages behind the closing bar and as a result prevents undesired opening of the lid.

10 Claims, 3 Drawing Sheets

MOTOR VEHICLE

CROSS-REFERENCE TO RELATED APPLICATION

This application claims the priority, under 35 U.S.C. §119, of German application DE 10 2009 058 988.0, filed Dec. 18, 2009; the prior application is herewith incorporated by reference in its entirety.

BACKGROUND OF THE INVENTION

Field of the Invention

The present invention relates to a motor vehicle having a storage compartment with a housing, a lid which closes the housing, and a locking mechanism which has a housing-side closing bar and a lid-side bolt which interacts with the latter and which engages behind the closing bar in the locked state and releases the closing bar through rotation.

Published, non-prosecuted German patent application DE 103 11 928 A1, corresponding to U.S. Pat. No. 6,802,550, discloses a motor vehicle of the generic type, having an emergency locking console arrangement for automatically locking a center console during a vehicle collision. The arrangement has here an upwardly open container which is coupled to the motor vehicle, wherein the container has a lid which is coupled thereto so that various objects can be shut in the arrangement. The emergency locking console arrangement has an inertia-operated locking mechanism which is coupled to the container for the purpose of automatic engagement of the lid and of locking of the arrangement in a closed position during a vehicle collision.

German patent DE 10 2004 028 846 B3, corresponding to U.S patent publication No. 20090134633, discloses a vehicle component which contains a pivotable component of a locking device, wherein the locking device has a latching hook which in an operational situation can be rotated about a first rotational axis from a locking position into an unlocking position. The unlocking component can be folded here about a second rotational axis in an opening direction from an essentially vertical position of rest into an essentially horizontal through-loading position. In the event of a pivotable component being located in the locked position at rest, the first rotational axis is displaced relative to the pivotable component from an operating position into a crash position by a force acting in the opening direction of the pivotable component, as a result of which the latching hook preferably interacts in a reversible fashion with the pivotable component such that the component can no longer be unlocked.

German patent DE 10 2004 025 394 B4 discloses a catch arrangement for securing an accessory vehicle component to an anchoring element. The catch arrangement contains here a hook element which is mounted so that it can move relative to a housing, wherein the hook arrangement contains a hook part for the connection to the anchoring element in order to secure the vehicle component relative to the anchoring element.

Finally, published, non-prosecuted German patent application DE 10 2005 043 593 A1, corresponding to U.S patent publication No. 20090218842, discloses a storage compartment for a motor vehicle having a housing and a housing lid which is pivotably arranged on the housing. Furthermore, a pivotably mounted locking element is provided which, in the event of an impact of the motor vehicle, is moved, by virtue of its mass inertia, into a locking position for arresting the pivoting lever.

In motor vehicles, in particular a high-end motor vehicle, a storage compartment is often provided between the rear seat, which storage compartment has a lid which can be folded over forward and can be locked by a locking mechanism. A wide variety of objects can be stored in this storage compartment. However, in the event of a vehicle crash, the locking mechanism is subjected to large forces, which can lead to the locking mechanism not withstanding the forces which occur, and the lid therefore jumping forward in the event of a vehicle crash. The objects which are then thrown out of the storage compartment may constitute a danger for the vehicle occupants.

SUMMARY OF THE INVENTION

It is accordingly an object of the invention to provide a motor vehicle which overcomes the above-mentioned disadvantages of the prior art devices of this general type, which is improved, or at least an alternative, embodiment which ensures, in particular, that the storage compartment is not undesirably opened in the event of a crash.

The present invention is based on the general idea of equipping a storage compartment, which is arranged essentially vertically in the region between two rear seats of a motor vehicle and has a lid which can fold forward, with a simple emergency securing device which, given sudden application of force to a housing of the storage compartment in the direction of the lid, that is to say from the rear, reliably prevents undesired springing open of the lid. The storage compartment contains here the housing and the lid which closes the latter, as well as a locking mechanism which has a housing-side closing bar and a bolt which interacts therewith, is arranged on the lid side and engages behind the closing bar in the locked state and releases the closing bar through rotation. The lid can be adjusted between a closed position which abuts against the housing and an open position which is moved forward. According to the invention, on an inner side of the lid an arrestor hook, which is formed as an emergency securing device, is provided which, in the event of a crash, engages behind the housing-side closing bar and as a result prevents undesired opening of the lid. Compared to emergency securing devices which are known from the prior art, the arrestor hook which is provided according to the invention is structurally simple and extremely cost-effective, so that reliable emergency securement can be achieved comparatively cost-effectively. In particular, there is no need for complex bolt mechanisms or additional bolt elements which are susceptible to faults, subjected to inertia and prevent springing up of the lid in the event of a crash.

In one advantageous embodiment of the solution according to the invention in the event of a crash the lid, and together with it the arrestor hook, is displaced upward relative to the housing. In the normal operating state, the arrestor hook is therefore arranged underneath the closing bar and is therefore not able to engage behind the closing bar or interact therewith. However, in the event of a crash the lid is displaced relative to the housing, as a result of which the arrestor hook engages behind the closing bar and as a result prevents undesired opening of the storage compartment. The relative displacement can be brought about here by virtue of the fact that in the event of a crash the housing of the storage compartment rotates about a first rotational axis, while the lid rotates about a second rotational axis which differs from the latter.

In a further advantageous embodiment of the solution according to the invention, the storage compartment is embodied as a business console and has, in particular, telecommunication connections. In this specific embodiment, a telephone or a laptop, which permits, for example, direct Internet access by a passenger sitting on a rear seat, can be integrated into the storage compartment. In particular in the case of a laptop which has a considerable weight, the emergency securing device according to the invention are highly advantageous here since in the event of a crash they reliably prevent the laptop from being thrown out and therefore constituting a hazard for the vehicle occupants on the one hand and, on the other hand, at the same time also protect the laptop against damage.

It goes without saying that the features which are specified above and the features which are still to be explained below can be used not only in the respectively given combination but also in other combinations or alone, without departing from the scope of the invention.

Other features which are considered as characteristic for the invention are set forth in the appended claims.

Although the invention is illustrated and described herein as embodied in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Preferred exemplary embodiments of the invention are illustrated in the drawings and will be explained in more detail in the subsequent description, wherein identical reference symbols relate to identical or similar or functionally identical components.

DETAILED DESCRIPTION OF THE INVENTION

Figure 1:
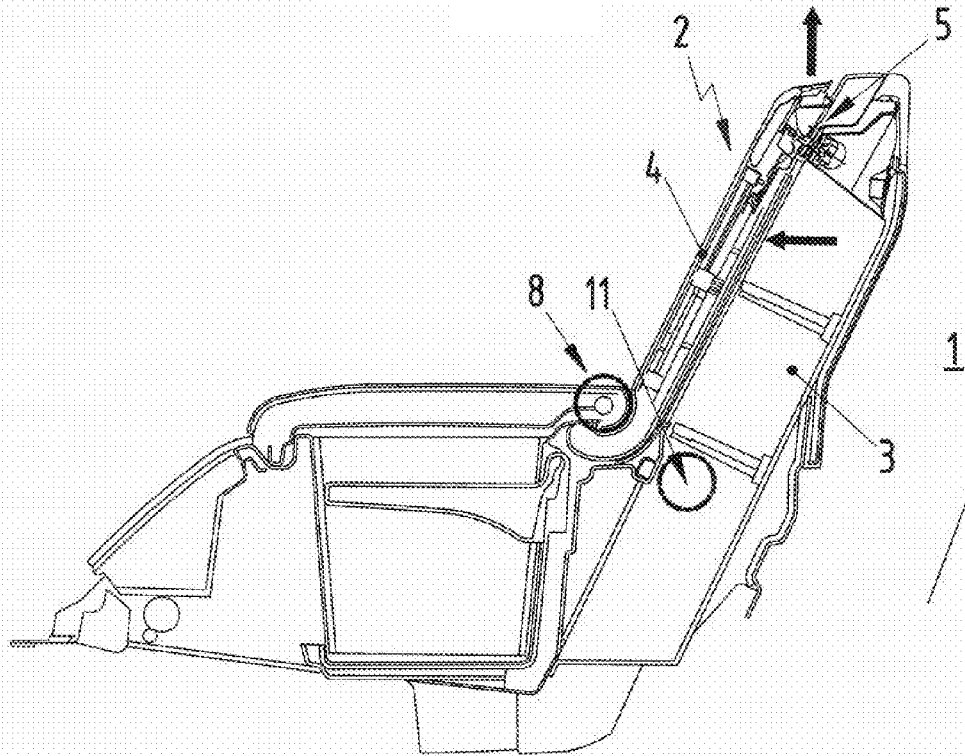
FIG. 1 is a diagrammatic, sectional view of a storage compartment according to the invention which is embodied in a motor vehicle seat.

Referring now to the figures of the drawing in detail and first, particularly, to FIG. 1 thereof, there is shown a storage compartment 2, which contains a housing 3 and a lid 4 which closes the latter, is provided in or next to a motor vehicle seat 1, in particular in or next to a rear seat, of a motor vehicle, which is otherwise not illustrated. Furthermore, a locking mechanism 5 is provided which has a housing-side closing bar 6 and a lid-side bolt 7 which interacts therewith and which engages behind the closing bar 6 in the locked state and releases the closing bar 6 through simple rotation (see in particular FIG. 2). The storage compartment 2 is arranged essentially vertically here according to FIG. 1, wherein the lid 4 is mounted so as to be rotatable about a first axis 8 and can be adjusted between a closed position which abuts against the housing 3 and an open position which is moved forward. On an inner side of the lid 4, an arrestor hook 9, which is embodied as an emergency securing device, is provided here (see FIGS. 2-6), wherein in the event of a sudden application of force of the housing 3 in a direction 10 of the lid 4, that is to say in particular in the event of a crash, the arrestor hook 9 engages behind the closing bar 6 and as a result reliably prevents undesired opening of the lid 4.

Figure 2:
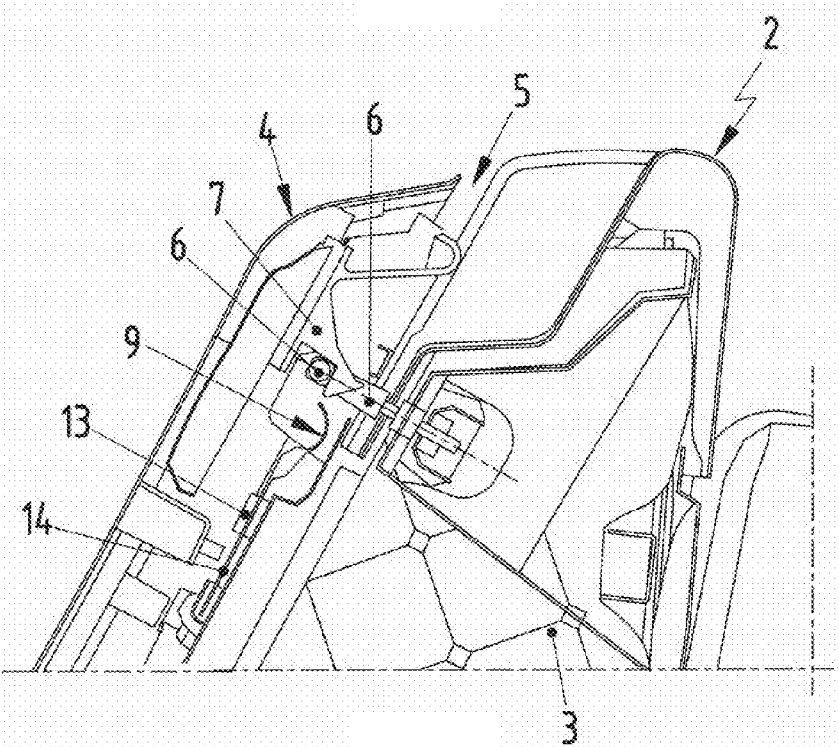
FIG. 2 is a sectional view showing a detail from FIG. 1 in a normal operating state.

FIG. 2 shows in this context that in the normal operating state the arrestor hook 9 is arranged underneath the closing bar 6 and therefore neither interacts with it nor engages behind it. The storage compartment 2 can generally be embodied as what is referred to as a business console and can have, in particular, telecommunication connections, for example for connecting a telephone or a laptop.

If a crash situation occurs, that is to say there is a sudden application force acting in the direction 10 of the housing 3 of the storage compartment 2, the lid 4, and together with it the arrestor hook 9, is displaced upward relative to the housing 3, which can be seen clearly in FIGS. 3-6. The relative displacement of the lid 4 with respect to the housing 3 comes about here as a result of the fact that in the crash situation and when there is an application of force 10 from the rear, the housing 3 rotates about a second axis 11 while the lid 4 rotates about the first axis 8. The rotation of the housing 3 about the second axis 11 is brought about through utilization of the deformation of the housing.

Figure 3:
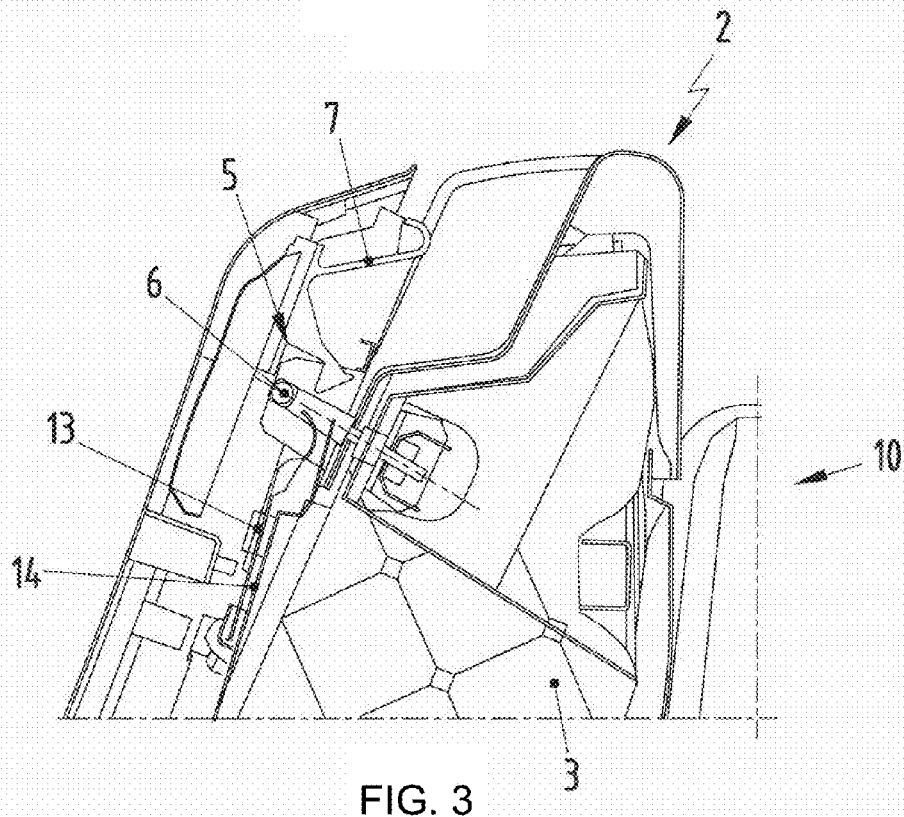
FIGS. 3-6 are sectional views showing an interaction between a lid-side arrestor hook and a housing-side closing bar during a vehicle crash.
Figure 4:
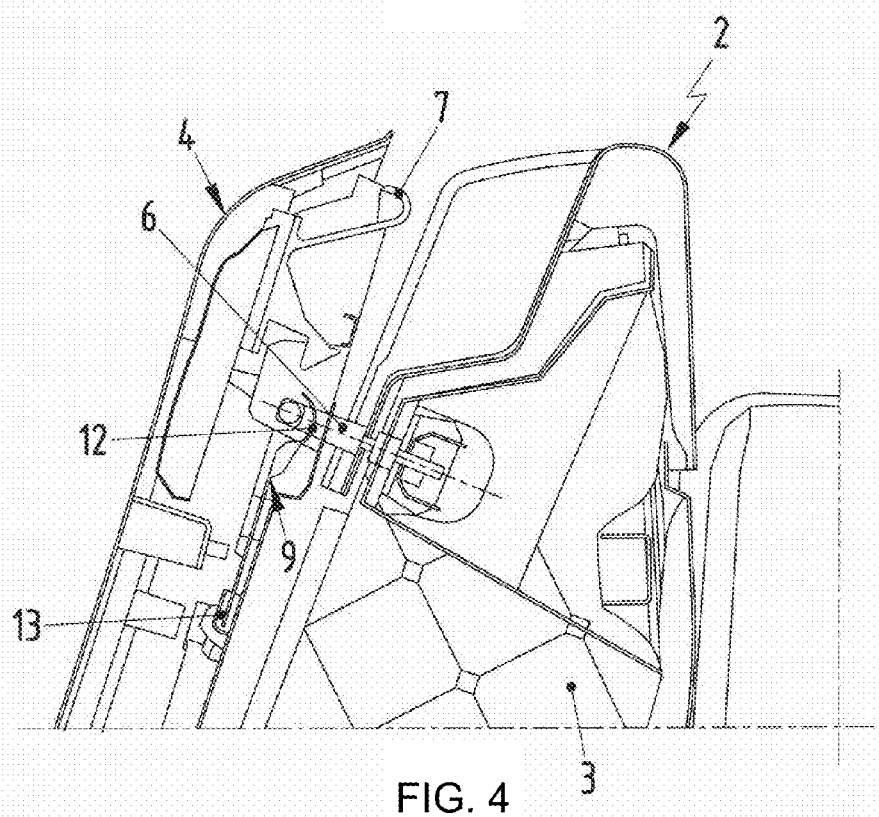
Figure 5:
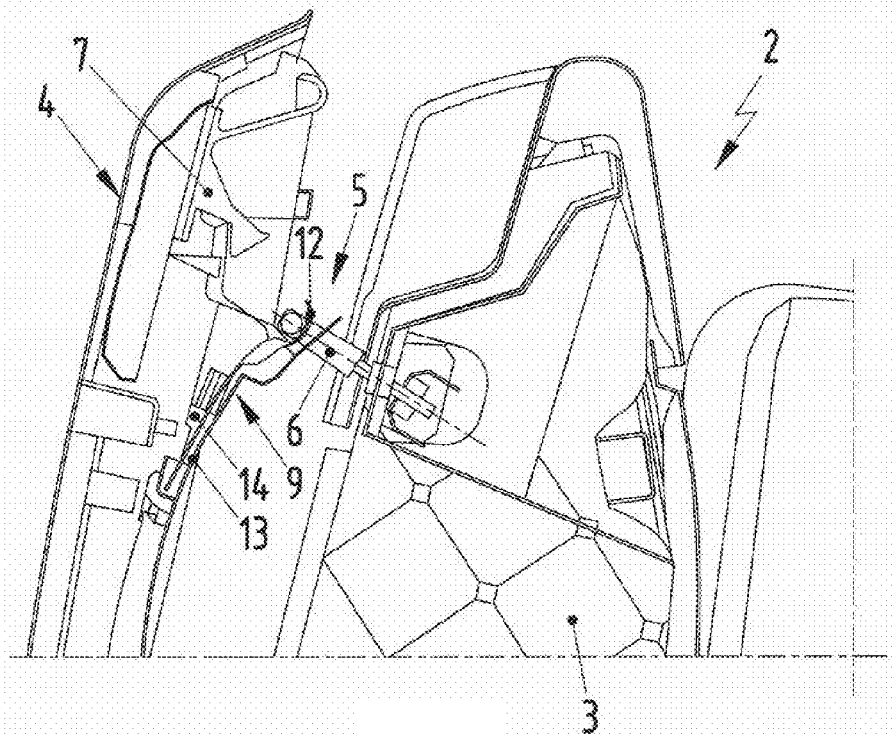
Figure 6:
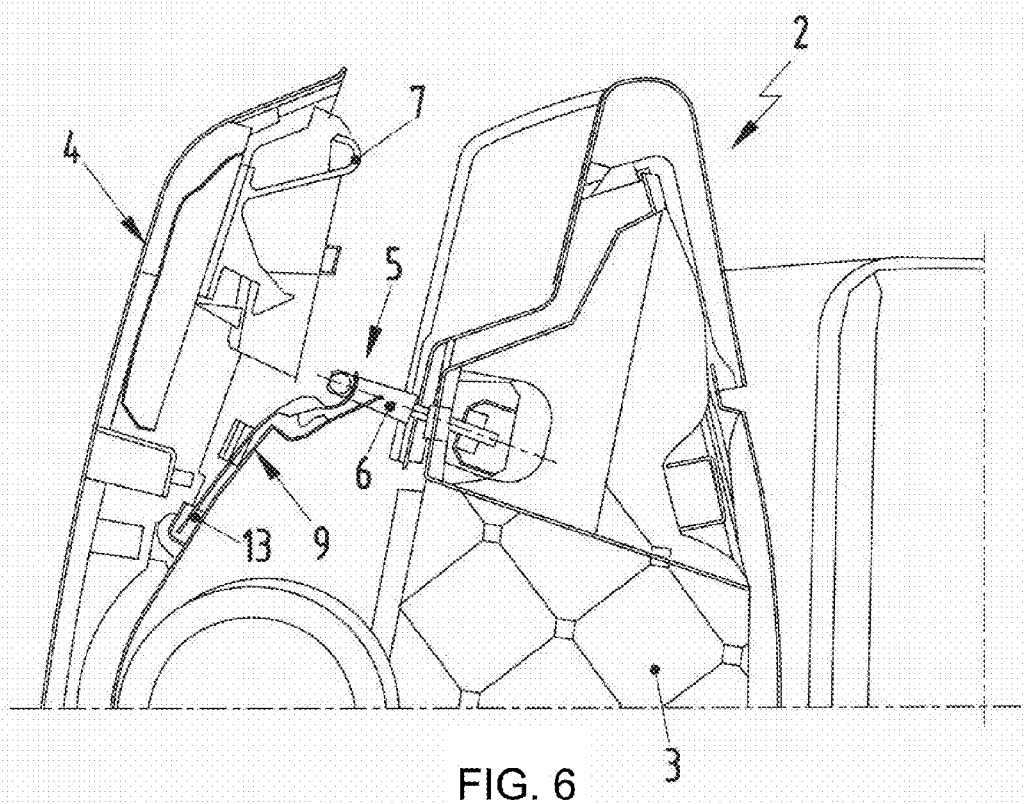

FIG. 3 shows in this context the start of a vehicle crash during which the force 10 which acts on the storage compartment 2 from the rear is so strong that the normal bolt 7 of the locking mechanism 5 becomes released from the closing bar 6 and as a result the lid 4 would open if the arrestor hook 9 were not present. However, as a result of the lid 4 being pushed upward relative to the housing 3 of the storage compartment 2, the arrestor hook 9 engages with its hook element 12 behind the closing bar 6, as a result of which the lid 4 is reliably prevented from opening. Owing to the, under certain circumstances, large application of force, the arrestor hook 9 or the hook element 12 and/or the closing bar 6 may be at least partially bent in this context, the deformation forces which occur here absorbing crash energy. Generally, the arrestor hook 9 is embodied with a strength such that it can absorb without problems forces which usually occur in a vehicle crash and can hold the lid 4 in its closed position. The arrestor hook 9 is usually made of metal, in particular from steel, and has a plate-shaped projection 13 with which it is fitted, that is to say is connected, into corresponding guides 14 on the lid 4. Furthermore, the plate-shaped projection 13 of the arrestor hook 9 can be bonded or welded to the lid 4. For the purpose of further absorption of deformation forces and therefore absorption of energy in the event of a crash, the hook element 12 can be of at least slightly elastic configuration. Furthermore, from FIGS. 2-6 it is apparent that the arrestor hook 9 and the bolt 7 engage behind the closing bar 6 from different directions, and in this context simultaneous engagement behind the closing bar 6 does not occur at any time.

With the storage compartment 2 according to the invention it is therefore possible to implement an emergency securing device or emergency holding device which is conceivably simple in structural terms and is capable, even in the event of a vehicle crash, of holding the lid 4 in the closed state and therefore reliably preventing objects arranged in the storage compartment 2 from falling out, as a result of which, in particular, a potential hazard for vehicle occupants sitting in the motor vehicle can be reduced.

The invention claimed is:

1. A motor vehicle, comprising:
   two rear seats;
   a storage compartment having a housing and rotating about a first axis, a lid closing said housing, and a locking mechanism with a housing-side closing bar and a lid-side bolt interacting with said housing-side closing bar and engaging behind said housing-side closing bar in a locked state and releasing from said housing-side closing bar through rotation, said storage compartment disposed vertically between said two rear seats, said lid being adjusted between a closed position which abuts against said housing and an open position which is moved forward; and an arrestor hook, formed as an emergency securing device, disposed on an inner side of said lid, said arrestor hook engaging behind said housing-side closing bar if a force is suddenly applied to said housing to rotate said housing about a second axis displaced from the first axis, and as a result prevents undesired opening of said lid.

2. The motor vehicle according to claim 1, wherein in a normal operating state said housing-side closing bar is disposed higher than said arrestor hook.

3. The motor vehicle according to claim 1, wherein said lid and said arrestor hook in an event of the crash are displaced upward relative to said housing due to crash forces.

4. The motor vehicle according to claim 1, wherein said storage compartment is embodied as a business console.

5. The motor vehicle according to claim 1, wherein said arrestor hook is made of a metal.

6. The motor vehicle according to claim 1, wherein:
said lid has corresponding guides formed therein; and
said arrestor hook has a plate-shaped projection, with which it is fitted into said corresponding guides on said lid.

7. The motor vehicle according to claim 6, wherein said plate-shaped projection is one of bonded and welded to said lid.

8. The motor vehicle according to claim 6, further comprising a hook element which is, at least slightly elastic and is integrally formed on to said plate-shaped projection of said arrestor hook.

9. The motor vehicle according to claim 1, wherein said arrestor hook and said lid-side bolt engage behind said housing-side closing bar from different directions.

10. The motor vehicle according to claim 1, wherein said arrestor hook is made of steel.

* * * * *